United States Patent [19]

DeShazer

[11] 3,914,018
[45] Oct. 21, 1975

[54] YTTRIUM ORTHOVANADATE OPTICAL POLARIZER

[75] Inventor: Larry G. DeShazer, Palos Verdes, Calif.

[73] Assignee: Union Carbide Corporation, New York, N.Y.

[22] Filed: Nov. 20, 1973

[21] Appl. No.: 417,557

Related U.S. Application Data

[63] Continuation of Ser. No. 148,684, June 1, 1971, abandoned.

[52] U.S. Cl................................. 350/157; 350/147
[51] Int. Cl.² .......................................... G02B 1/24
[58] Field of Search ............ 350/147, 157; 331/94.5

[56] References Cited
UNITED STATES PATENTS
3,700,308   10/1972   Nicolai................................ 350/157

OTHER PUBLICATIONS

Kingsley, "Optical Constants of YVO$_4$ Between 2 and 25 ev" Jan. 1970, Journal of Applied Physics, Vol. 41, No. 1, pp. 370-375.

W. A. Shurcliff, "Polarized Light Production and Use," Harvard Univ. Press, Cambridge, Mass. 1962, pp. 71-73.

A. K. Levine, "Lasers" Marcel Dekker Inc., New York (1971) pp. 219-221.

Primary Examiner—Alfred E. Smith
Assistant Examiner—Michael J. Tokar
Attorney, Agent, or Firm—Harrie M. Humphreys

[57] ABSTRACT

An optical polarizer containing yttrium orthovanadate as a birefringent material. Such polarizers are particularly useful in polarizing the output of laser devices.

6 Claims, 5 Drawing Figures

INVENTOR
LARRY G. DESHAZER
ATTORNEY

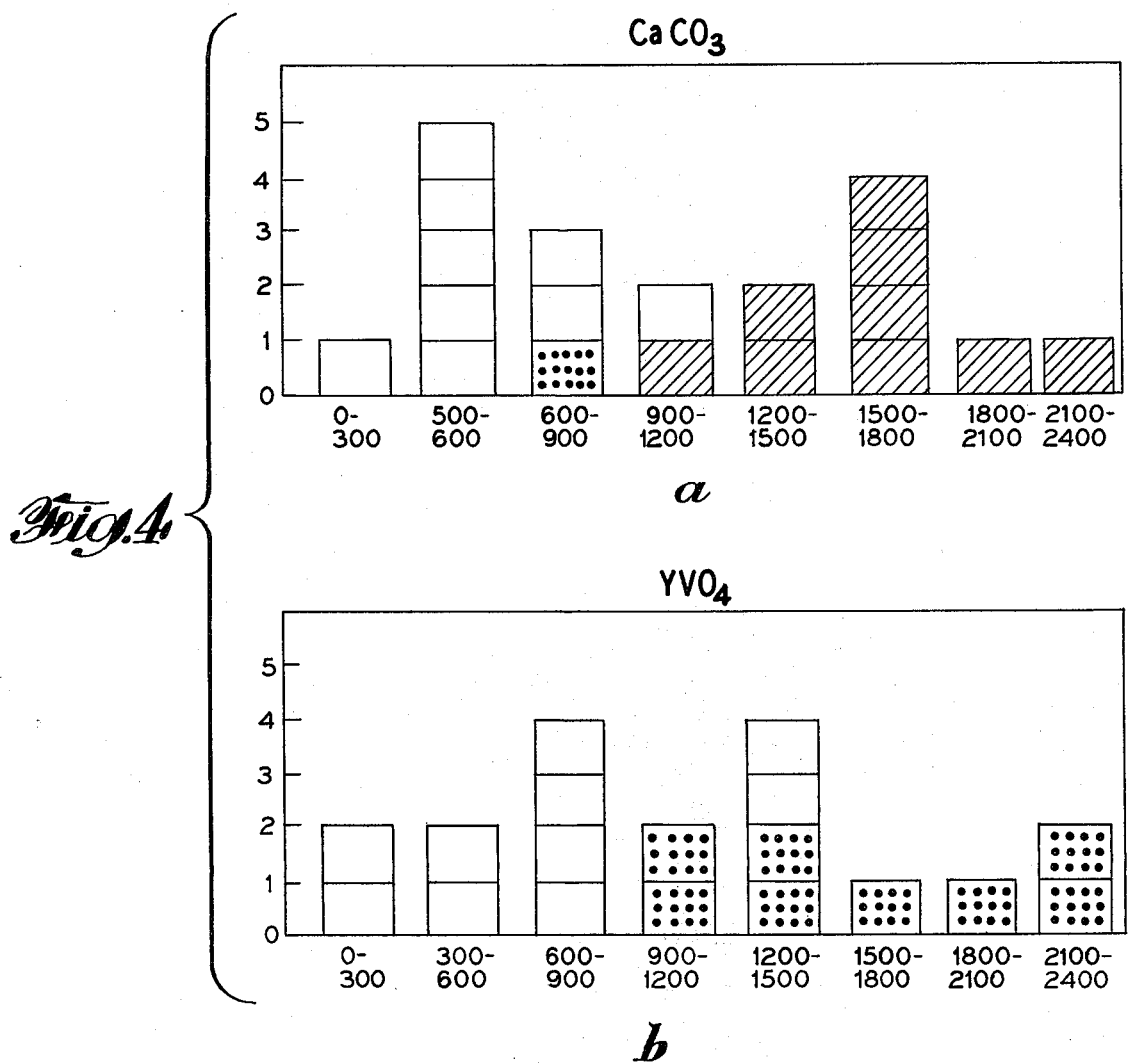

YTTRIUM ORTHOVANADATE OPTICAL POLARIZER

This is a continuation of application Ser. No. 148,684, filed June 1, 1971, and now abandoned.

SUMMARY OF THE INVENTION

The present invention includes optical polarizers containing (undoped) yttrium orthovanadate as a birefringent crystallent material. The invention also includes the combination of a laser device and an optical polarizer containing yttrium orthovanadate disposed in the path of the laser output beam in order to increase the degree of polarization of the laser output.

BACKGROUND

Crystalline materials have been used as optical polarizers for many years, calcite and quartz being the two materials most often employed. In recent years lasers have been developed, with lasers whose output is in the infrared or optical frequency range being of greatest interest. For many applications of lasers, such as second harmonic generation or electrooptic Q-switching, it is desirable to polarize the coherent light produced by the laser.

To date, good optical quality polarizers have been constructed from natural calcite or quartz and it is these crystalline polarizers that are presently used in laser systems. Calcite, because of its high birefringence, is the preferred material for most applications but it has become increasingly difficult to find natural crystals of calcite exhibiting both high internal quality and large size. At present, the design and quality of calcite polarizers is controlled by a combination of these material problems, and the difficulty of fabricating optical surfaces, a problem inherent to calcite. An example of the best present polarizer structure is the "Glan Brewster-Angle Double-Escape Polarizer" described in Bulletin No. N-1-70 of the Karl Lambrecht Corporation. However, even this high quality calcite polarizer is not completely satisfactory, particularly in high-power optical systems, despite its inherent design complexity.

It has now been discovered that the crystalline material yttrium orthovanadate ($YVO_4$) is an excellent polarizing material and is particularly well suited for use in conjunction with laser devices. Yttrium orthovanadate crystals have a number of unexpectedly desirable properties over crystalline polarizers heretofore known, as will be discussed in more detail hereinafter.

THE DRAWINGS

In the drawings:

FIG. 4 is a bar chart comparing laser damage resistance of $YVO_4$ and calcite.

DETAILED DESCRIPTION

Figure 1:
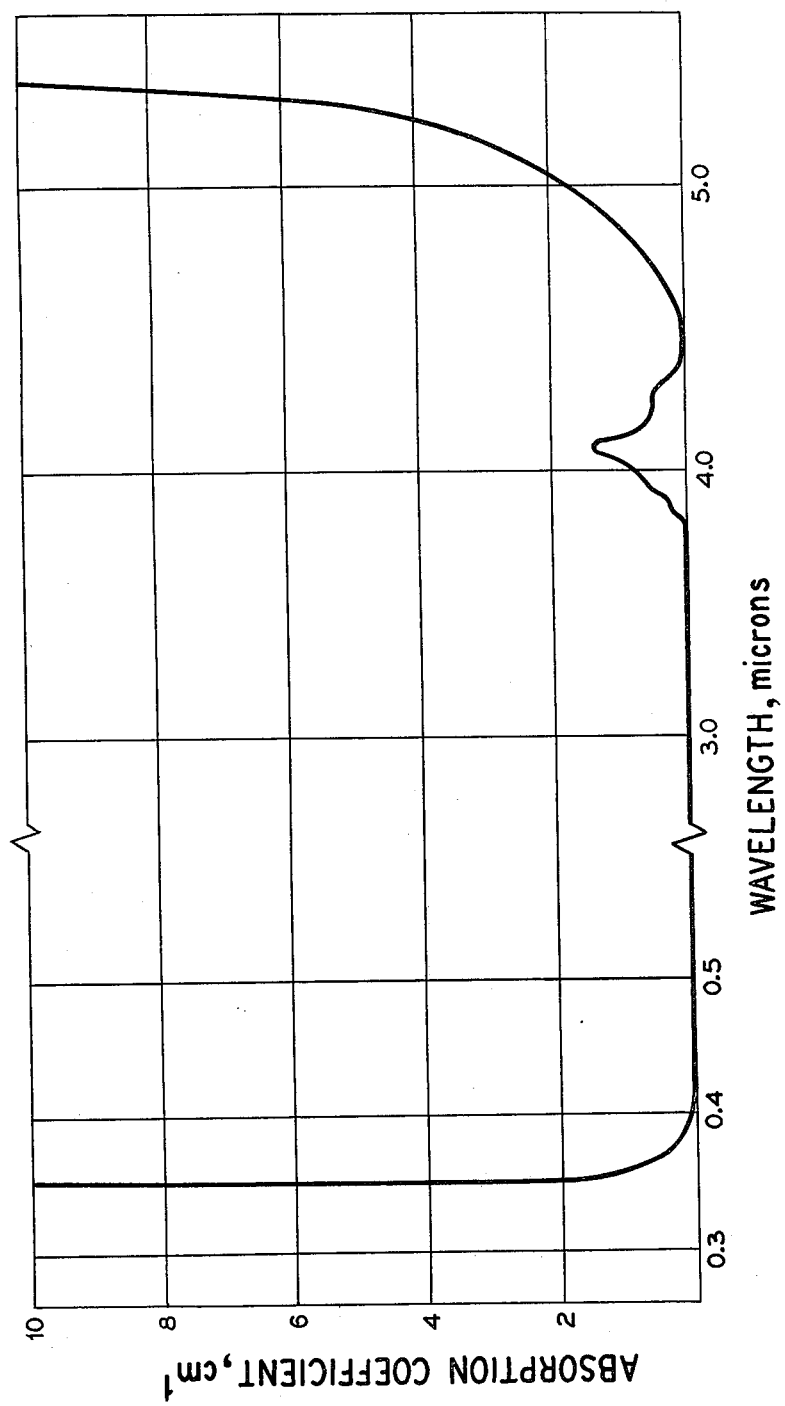
FIG. 1 is a graph showing the infrared absorption spectrum of yttrium orthovanadate.

As used herein the terms "optical polarizer" means a device which increases the degree of polarization of light which passes through it; thus, an optical polarizer will cause some polarization of unpolarized light which passes through it and/or will increase the degree of polarization of partially polarized light which passes through it. The yttrium orthovanadate polarizing material can be used alone or in conjunction with other materials such as quartz or glass in order to form an optical polarizer device.

Yttrium orthovanadate is a synthetic crystalline material which was first produced about forty years ago. See Broch, Zeit. Phys. Chem. 20B, 345 (1933). More recently, yttrium orthovanadate doped with rare earth ions has been used as a phosphor in television tubes, and single crystals of yttrium orthovanadate doped with rare earth ions have been proposed, though not commercially used, as laser materials. See Levine et al Appl. Phys. Letters 5, 118 (1964); Brecher, Phys. Rev., 155, 178 (1967); Ballman et al, U.S. Re No. 26,184. Also, studies have been made of some of the optical properties of yttrium orthovanadate, although a published article on this subject, Kingsley et al, J. Appl. Physics, 41, 370 (1970), contains some incorrect results in that the sign of the birefringence was given as negative. Yttrium orthovanadate is a positive uniaxial crystal.

Yttrium orthovanadate (undoped) can be produced by the methods described in the Broch, and Ballman et al references cited above, and in Rubin et al, J. Applied Physics, 37, 2920 (1966), provided that sources of dopants are omitted from the processes of Ballman et al and Rubin et al. Following the procedures of Rubin et al, yttrium orthovanadate crystals can be produced by pulling from a melt contained in a crucible which is heated in an oxy-hydrogen furnace. The empty crucible is heated to about 1,900°C. while an argon stream is directed over its surface. Argon has been found to be more effective than nitrogen in minimizing bubbling at the surface of the melt. The $YVO_4$ powder is then added incrementally. It sinters as it is added, thus greatly reducing its volume. When the crucible is full, the temperature is raised to about 2000°C. At this temperature most of the feed material is liquid; however, the upper layer remains solid. A hole about ¼ inch in diameter is then punched through the crust with an iridium rod. Subsequently, the molten condition is held for an hour or more to harden the top crust. The hole is then enlarged to 1 inch and additional powder is added until the surface of the melt is about ¼ inch below the lip formed by the crust. It is important to avoid contact between the melt and the lip otherwise nucleation may be initiated by the latter. The temperature is then reduced to about 1940°C. before seeding. Under these conditions, a stable melt is obtained with an argon flow of about 15 cubic feet per hour. The crystal is then pulled by conventional techniques. Rubin et al employed growth rates of ¼ inch per hour and rotation rates of 22 rpm.

Yttrium orthovanadate is an excellent polarizing material because of its relatively large birefringence and high refractive index. The measured birefringence is 0.226 for light of wave length 5890 angstroms (sodium D line); the measured refractive indices are $n_o=2.000$ and $n_e=2.226$ at the same wave length. ($n_o$=refractive index for the ordinary ray; $n_e$=refractive index for the extraordinary ray.)

In addition to the above described high birefringence and refractive index, yttrium orthovanadate has several unexpected advantages and physical characteristics which render such crystals particularly useful in optical polarizers. One unexpected advantage is the resistance of yttrium orthovanadate to optical radiation induced damage. This is particularly important for use in conjunction with the output of high power laser systems.

A second unexpected advantage is the wide range of useful spectral adsorption in the wave length range of 0 to 5 microns, including the range of 3.0 to 5.0 microns where conventional materials, such as calcite are inoperative.

A third unexpected advantage occurs in the ease with which yttrium orthovanadate can be combined with nonreflective coating materials. As a general rule, a preferred antireflection coating material is one whose index of refraction is equal to the square root of the index of refraction of the crystalline birefringent material. An ideal antireflection coating material for $YVO_4$ would have a refractive index of 1.414, and one of the best known antireflective coating materials (magnesium fluoride) has an index of 1.38, a very close match.

The properties and advantages of yttrium orthovanadate will now be discussed in more detail with reference to the accompanying drawings.

FIG. 1 is a graph of the absorption spectrum of undoped yttrium orthovanadate, based on measurements on a polished single crystal. In the graph of FIG. 1 the absorption coefficient is defined as the negative of the inverse of the path length multiplied by the natural logarithm of the transmission. The wavelength is expressed in microns. The region between 0.5 and 3.0 microns is omitted from FIG. 1 as there is no detectable absorption over that range. As is shown in FIG. 1, yttrium orthovanadate is highly transmissive in the range from 0.4 to 3.8 microns and is useful in optical devices over the additional range of 3.8 to 5.0 microns. No other useful crystalline polarizing material has this high transmission in the 3.0 to 3.8 micron range.

By way of comparison, a calcite crystal measured in the same system under the same conditions began to show significant absorption at 2.1 microns and was completely opaque at wavelengths greater than 3.1 microns. Published data for quartz crystals (American Institute of Physics Handbook, McGraw-Hill Book Co., 1957, p. 6–37) shows that quartz becomes absorptive beginning at less than 3.0 microns.

Figure 2:
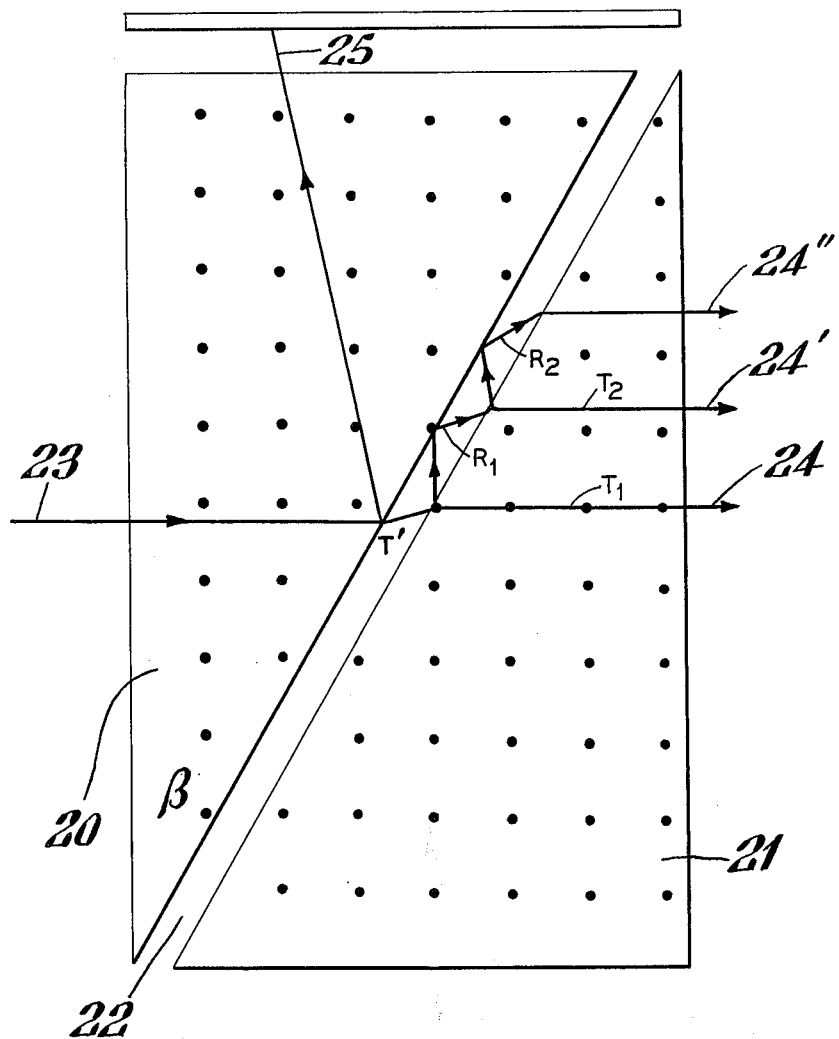
FIGS. 2, 3a and 3b are schematic representations of typical optical polarizers which illustrate the present invention.
Figure 3A:
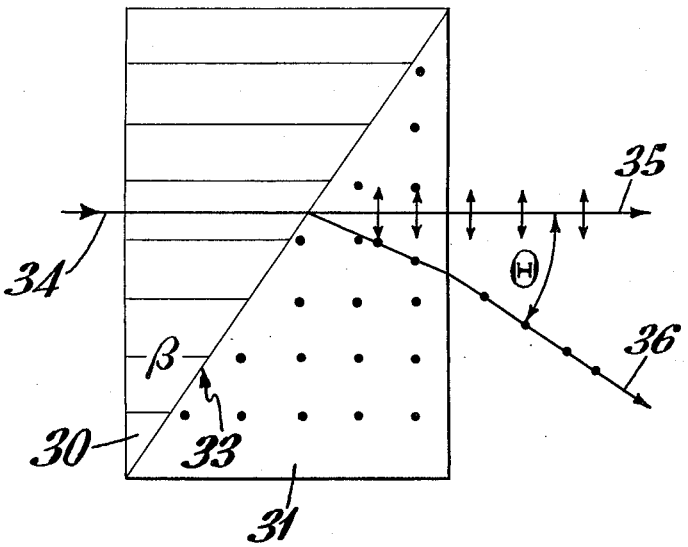
Figure 3B:
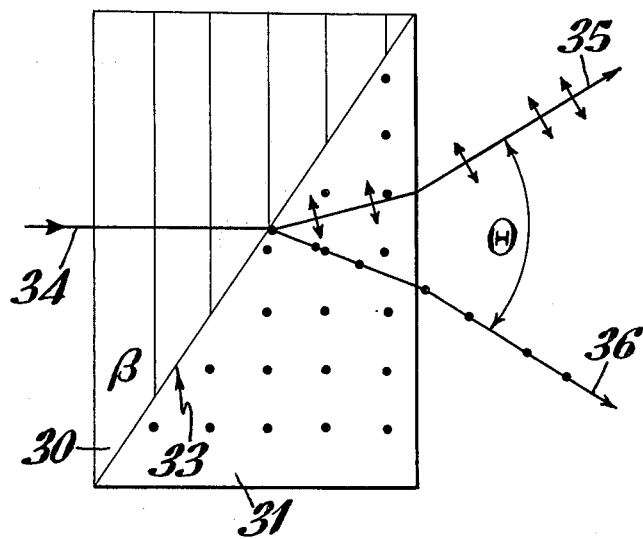

In FIGS. 2 and 3, to which reference will now be made, the lines or dots indicate, respectively, that the direction of the optic axis is parallel to or perpendicular to the plane of the paper. In addition, the lines are parallel to the optic axis, and the dots represent cross sections of straight lines which are parallel to the optic axis.

FIG. 2 is a schematic drawing of a typical Glan-type polarizer. The Glan polarizer represents the most useful current design and is constructed from two pieces of doubly-refracting material 20 and 21 each in the form of a right angle prism. The two prisms are placed together with a thin air gap 22 between the respective hypotenuse faces. The unpolarized light ray 23 is separated into transmitted rays 24, 24', and 24'', and a ray 25 which is reflected and adsorbed. In the so-called Glan-Foucault design, the optic axis of both prisms is parallel to the plane of the air gap, as shown in FIG. 2.

In the so-called Glan-Taylor design, the first prism 20 is cut so that the optic axis is perpendicular to the plane of the air gap. In the Glan-Foucault design for materials having a positive birefringence the ordinary ray is transmitted and the extraordinary ray is reflected, while for materials of negative birefringence the extraordinary ray is transmitted and the ordinary ray reflected.

$YVO_4$ being a positive uniaxial crystal, it is the ordinary ray which is transmitted and the Glan-Foucault design is the correct one for maximum transmission. For calcite (negative uniaxial crystal) using the same design the extraordinary ray is transmitted, which results in an undesirably high reflectivity, a problem which can be solved to some extent by using the Glan-Taylor design for negative crystals.

Calculations have been made showing the total transmitted energy through both the air gap and the second prism 21 as a fraction of the energy in the first prism 20, represented by $T'$ and $T_1$ in FIG. 2. The reflected energies $R_1$ and $R_2$ within the air gap have also been calculated along with the energy $T_2$ of the second transmitted ray relative to a transmitted energy of unity within the first prism.

The results of these calculations are shown in Table I where a comparison is made between $YVO_4$ cut with a Glan-Foucault polarizer design, and calcite cut with both a Glan-Foucault and a Glan-Taylor design. The wavelength used in all cases was 6000A. The $YVO_4$ had a prism angle ($\beta$ in FIG. 2) of 27.5° and calcite a prism angle $\beta$ of 38.5°, these angles being optimum for each material.

It should be noted that the yttrium orthovanadate prism gives the best performance with 99.0% of the polarized incident energy being transmitted in the main beam, with a reduction of $10^{-5}$ for the secondary beam. Equivalent figures using calcite are 94.8 and 55.1% for the main beam, and $10^{-3}$ and $10^{-1}$ for the secondary beam. Changing from the Glan-Foucault to Glan-Taylor design for calcite reduces the intensity of the secondary transmitted beam by two orders or magnitude. A similar reduction is realized by going from the best calcite design to a Glan-Foucault prism using yttrium orthovanadate.

This improved performance of yttrium orthovanadate becomes more important for high power laser use where the input beam can have power levels up to $10^9$ watts. The reduction by two orders of magnitude will allow the polarizer to be used under high conditions which are currently unattainable with calcite prisms.

TABLE I

| Prism | Material | Prism Angle $\beta$ | Transmitted Ray Ref. Index | $T'$ | $T_1$ | $R_1$ | $R_2$ |
| --- | --- | --- | --- | --- | --- | --- | --- |
| Glan-Foucault | $YVO_4$ | 27.5° | Ord. 1.9974 | 0.995 | 0.990 | 0.005 | $10^{-5}$ |
| Glan-Taylor | Calcite | 38.5° | Extr. 1.486 | 0.974 | 0.948 | 0.026 | 0.001 |
| Glan-Foucault | Calcite | 38.5° | Extr. 1.486 | 0.742 | 0.551 | 0.258 | 0.066 |

Another type of polarizing prism frequently used are the Rochon and Wollaston designs. These polarizers, shown schematically in FIG. 3, differ from the Glan-type in that they preserve both of the refracted beams but separate them widely enough to be used individually. These structures are, thus, both polarizers and and polarizing beam splitters. The Rochon type is shown schematically in FIG. 3a and the Wollaston type is shown schematically in FIG. 3b. Both of these polarizers are constructed from two right angle prisms 30 and 31 which are cut from suitable birefringent materials and are optically contacted or cemented along their hypotenuse surfaces 33. The optic axes of the prism sections are mutually perpendicular. For positive uniaxial crystals, unpolarized light beam 34 enters the polarizer and emerges as separate ordinary ray 35 and extraordinary ray 36. For negative uniaxial crystals the ordinary and extraordinary rays are reversed.

With the Rochon polarizer, the unpolarized incident ray travels along the optic axis and is split into two rays each with the same velocity. On transferring across the prism interface 33, the ordinary ray maintains the same velocity and proceeds through the second crystal undeflected. The velocity is changed for the extraordinary ray and its is deflected. Further separation occurs when the extraordinary ray leaves the second prism, and the angle of divergence can be calculated using standard optical techniques.

The divergence angle $\theta$ (see FIG. 3) has been calculated as shown in Table II as a function of prism angle $\beta$ (see FIG. 3) for different wavelengths using yttrium orthovanadate, calcite, and quartz as the prism materials. This was a computer calculation assuming perfect optical contacting between the prism faces. As can be seen, a significant improvement is projected for the divergence angle $\theta$ of $YVO_4$ over both calcite and quartz.

For the Wollaston polarizer, the direction of the optic axis is changed for the first prism and an unpolarized incident ray is split up into two polarized beams each traveling in the same direction with different velocities determined by the corresponding refractive indices for each beam. On transferring across the prism interface 33, the ordinary ray in the first prims becomes the extraordinary ray in the second; the extraordinary ray is converted to the ordinary in a similar fashion. The resulting refractive index change causes the two polarized beams to be deflected at the interface. Further separation occurs when the beam passes from the high index crystal into air. The divergence angle $\theta$ for the Wollaston polarizer is approximately twice that realized for the Rochon polarizer. The Wollaston design does, however, suffer from the disadvantage that both transmitted beams are divergent. Values for the divergence angle $\theta$ for a $YVO_4$ Wollaston polarizer as a function of prism angle $\beta$ would be double those shown in Table II.

cussed hereinabove. Yttrium orthovanadate is also superior to other crystalline materials which are known to have a relatively high birefringence. One such material is rutile (birefringence +0.296) but no method has yet been developed for producing rutile crystals which have the high optical quality required for use as a polarizer or polarizing beam splitter. Another material is sodium nitrate (birefringence −0.249) which can be obtained in the form of high quality single crystals. However, sodium nitrate is soluble in water and highly hygroscopic which limits its usefulness to situations where it can be protected from moisture.

Yttrium orthovanadate has physical properties which make it more easily fabricated into optical devices than many other birefringent crystalline materials. It has an average hardness of 480 KHN (Knoop Hardness Number) which is equivalent to most optical glasses. This hardness and a minimization of cleaving tendency allow fabrication to proceed with production-type processes. Flatness can be developed to permit optical contacting of polarizer prism faces.

Successful fabrication of calcite presents a problem because of the hardness difference relative to the optic axis, and the tendency for calcite to cleave along the rhombohedral planes. To achieve the necessary tolerances for surface flatness and uniformity of polish requires extremely careful handling and finishing procedures which utilize predominantly hand-lapping. This involved fabrication procedure with its high labor cost contributes to the high cost of the finished polarizer.

The polished surface finish for $YVO_4$ is superior to that of calcite and can be achieved with much more ease. This improvement in optical workability can be traced to a hardness which is similar to glass, and, more important, to only a slight tendency to cleave. Cleavage has been induced and occurs parallel to the (100) surface. It does not, however, present any problems in prism fabrication.

There are two main advantages to be realized from the improved surface finish and ease of the optical working of $YVO_4$; (a) the material lends itself more easily to automated fabrication processes and can be handled by procedures more closely related to those experienced in a mass production operation, and (b) optical contacting of the polished surfaces can be achieved. This situation is difficult to achieve for calcite and is the main reason why devices such as the Ro-

TABLE II

| Material | Prism Angle | | | | | | | | | Wavelength A |
| --- | --- | --- | --- | --- | --- | --- | --- | --- | --- | --- |
| | 25 | 30 | 35 | 40 | 45 | 50 | 55 | 60 | 65 | |
| $YVO_4$ | 5.98 | 7.37 | 8.88 | 10.56 | 12.44 | 14.60 | 17.13 | 20.16 | 23.88 | 6000 |
| $YVO_4$ | 5.88 | 7.25 | 8.73 | 10.38 | 12.23 | 14.36 | 16.85 | 19.83 | 23.49 | 6500 |
| $CaCO_3$ | 4.50 | 5.54 | 6.67 | 7.93 | 9.33 | 10.94 | 12.80 | 15.02 | 17.71 | 6430 |
| Quartz | 0.24 | 0.30 | 0.36 | 0.44 | 0.52 | 0.62 | 0.74 | 0.89 | 1.10 | 5893 |

It can be seen from the above discussion and Table II that $YVO_4$ offers a substantial advantage in both the Rochan and Wollaston design over calcite and quartz. For a prism angle of 60° and assuming perfect optical contacting, the divergence angle for 6500A light is increased by over 30% when $YVO_4$ is substituted for calcite. This factor is obtain. more significant, because the improved fabricability (discussed hereinbelow) of the yttrium orthovanadate makes good optical contact much easer to obtain.

The advantages of yttrium orthovanadate as an optical polarizer over quartz and calcite have been dischon and Wollaston polarizers (which rely on good optical contacting) are frequently constructed from quartz, for which the reduced birefringence is compensated by the superior optical surfaces. Yttrium orthovanadate has both a high birefringence and excellent optical surfaces.

The following examples further illustrate the invention.

EXAMPLE 1

Single crystal undoped yttrium orthovanadate was cut and assembled into Rochon and Wollaston polarizers. The two prism sections were cemented by a thin layer of benzylbenzoate which was chosen because of its high refractive index (1.78) and good transmission in the ultraviolet spectral region. (In later improved designs, Canada balsam was used as the cement.) Unpolarized light of 6328 angstroms from a helium-neon gas laser was passed into the polarizer at normal incidence. The angle of divergence $\theta$ of the ordinary and extraordinary components emerging from the exit face of the polarizer was measured by means of a Spencer spectrometer. For the Rochon polarizer, which had a prism angle $\beta$ of 60.15°, the angle $\theta$ was 21° and for the Wollaston prism for which the prism angle $\beta$ was 28° the angle $\theta$ was 13°, both divergence angles being in good agreement with the calculated data of Table II.

EXAMPLE 2

In order to measure the damage resistance of yttrium orthovanadate as opposed to calcite, polished single crystal rectangular pieces of undoped yttrium orthovandate and calcite were subjected to output radiation from a Q-switched ruby laser. The results are summarized in FIG. 4. In both FIG. 4a (relating to calcite) and FIG. 4b (relating to yttrium orthovanadate) the vertical axis shows the number of laser output pulses (firings) to which the crystals were subjected and the horizontal axis shows the range of power density of the laser output pulses in increments of 300 megawatts per square centimeter. The laser output wavelength was 6943A and the output pulse duration was 15 nanoseconds. In FIG. 4, each rectangle represents a single firing at the designated power level. An unmarked rectangle indicates that the pulse caused no visible damage to the crystal; a dotted rectangle indicates that the pulse caused only surface damage to the crystal; a cross-hatched rectangle indicates that the pulse caused gross internal damage to the crystal. After each firing the crystals were inspected for damage by passing the output beam from a helium-neon laser through the crystal and observing the scattering. The results showed that calcite began to experience significant internal damage at power levels in the range 900 – 1200 megawatts per square centimeter and suffered extensive damage at all power levels above this range. In every case the damage to the calcite was serious enough to effect the optical quality of the crystal sample. For the undoped yttrium orthovanadate samples, some slight surface damage was observed at power levels in the 900 – 1200 megawatts per square centimeter range. However, the yttrium orthovanadate crystals could withstand power levels up to the 2100 – 2400 megawatt per square centimeter range without showing any detectable internal damage, and the optical quality of these samples remained high.

What is claimed is:

1. An optical polarizer having the Glan-Foucault, Rochon or Wollaston configuration and consisting essentially of undoped yttrium orthovanadate as a birefringent material.

2. A polarizer in accordance with claim 1 having the Glan-Foucault configuration.

3. A polarizer in accordance with claim 1 having the Rochon configuration.

4. A polarizer in accordance with claim 1 having the Wollaston configuration.

5. Apparatus comprising in combination (a) a laser and (b) a polarizer consisting essentially of undoped yttrium orthovanadate disposed in the path of the laser output beam for increasing the degree of polarization of said laser output beam.

6. Apparatus in accordance with claim 5 wherein said laser has output pulses having a power density of at least 900 watts per square centimeter.

* * * * *

UNITED STATES PATENT OFFICE
CERTIFICATE OF CORRECTION

Patent No. 3,914,018     Issue Date October 21, 1975

Inventor(s) L. G. DeShazer

It is certified that error appears in the above-identified patent and that said Letters Patent are hereby corrected as shown below:

Col. 4, line 49:  after "high" insert -- power --.
(typed specification page 10, line 24).

Col. 5, line 63:  "obtain." should read -- even --.
(typed specification page 15, line 7).

Signed and Sealed this twenty-seventh Day of January 1976

[SEAL]

Attest:

RUTH C. MASON
Attesting Officer

C. MARSHALL DANN
Commissioner of Patents and Trademarks